Jan. 28, 1930. E. J. VALLEN 1,745,131

CLUTCH

Original Filed June 3, 1927

INVENTOR
EARL J. VALLEN.
BY Ely & Barrow
ATTORNEYS.

Patented Jan. 28, 1930

1,745,131

UNITED STATES PATENT OFFICE

EARL J. VALLEN, OF AKRON, OHIO

CLUTCH

Original application filed June 3, 1927, Serial No. 196,258. Divided and this application filed January 7, 1928. Serial No. 245,159.

The present invention relates to clutches, the object of the invention being to devise a new and very efficient clutch as will be more fully understood from the description and drawings.

The clutch shown herein is especially adapted and intended for use in connection with mechanism for operating sliding doors or curtains, and as such is shown in conjunction with curtain or door operating and control mechanism in my prior application Serial No. 196,258, filed June 3, 1927, which matured on May 8, 1928 into Patent No. 1,668,880 of which this application is a division.

In the present application the showing is restricted to the clutch, the balance of the mechanism being omitted. In the drawings.

Figure 1:
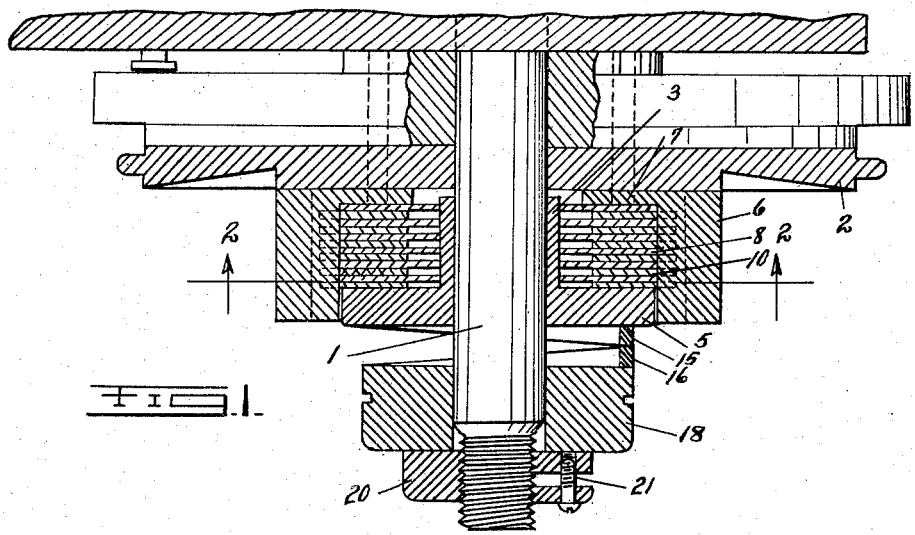
Figure 1 is a longitudinal section through the clutch.
Figure 2:
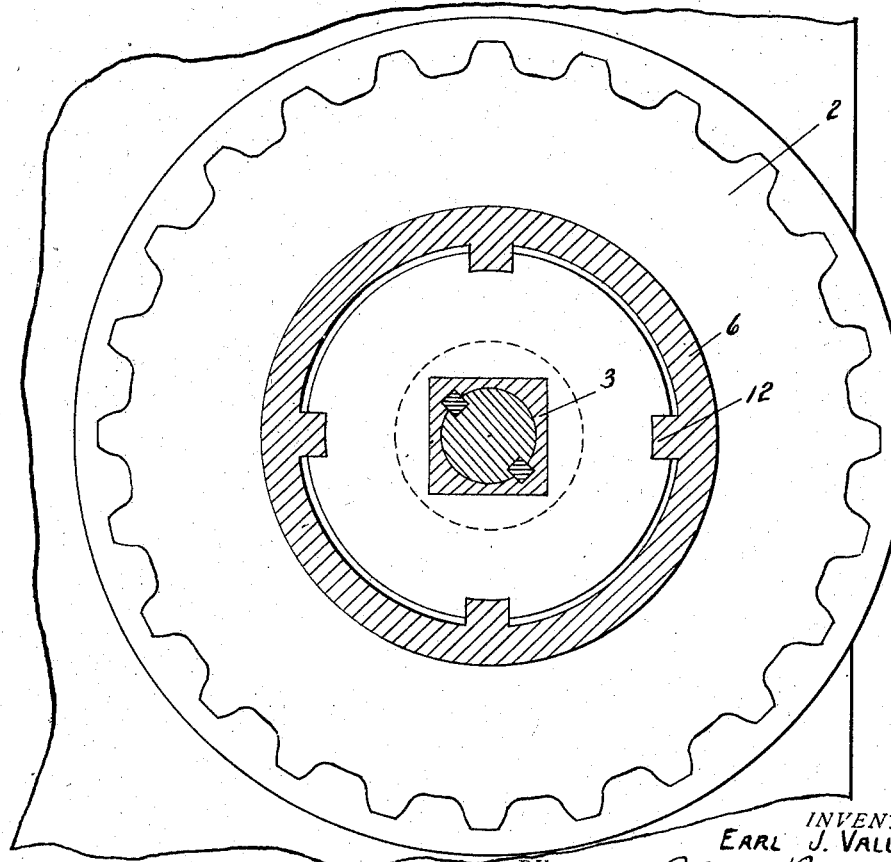
Figure 2 is a section on the line 2—2 of Figure 1.

Although power may be delivered to and transmitted from the clutch in either direction, the driving member shown herein is the shaft 1, which derives its power from any suitable source, and the driven member is the sprocket 2, which is rotatable upon the shaft 1.

To the shaft 1 is attached a sleeve 3 which is keyed to the shaft so as to be rotatable therewith and which is provided with a flange 5. This sleeve and its flange nest within an enclosing sleeve or cup 6 attached to the surface of the sprocket 2 and having a base 7 opposite the flange 5.

The outer surface of the sleeve 3 is non-circular, here being shown as square, and about this sleeve are fitted a plurality of loose friction disks 8 which are compelled to rotate with the sleeve by reason of the squared formation of the central opening of each disk.

Fitted between each of these disks are alternate friction disks 10 which clear the sleeve 3 but are compelled to rotate with the cup 6 by reason of a plurality of feathered keyways 12.

The alternate disks 8 and 10 are pressed against one another by movement of the sleeve 3 along the shaft, the flange 5 compressing the disks against each other with greater or less force, depending upon the position of the parts, and thereby transmitting power from the shaft 1 to the sprocket 2. The movement of the sleeve is controlled by means of two cooperating cams 15 and 16, the former on the flange 5 and the latter on a collar 18 rotatable on the end of the shaft 1. As the collar 18 is rotated to bring the higher portions of the cams 15 and 16 in opposition, the compression within the clutch is varied with a nicety of adjustment which is distinctive of this form of clutch. The position of the collar 18 is fixed by means of a nut 20 on the threaded outer end of the shaft 1, this nut being provided with any suitable locking device indicated at 21.

In the curtain operating mechanism, the clutch as shown herein is unusually effective as it permits a fine adjustment of the driving mechanism so that under normal conditions the curtain will be operated. Should the movement of the curtain be interrupted for any reason the clutch will give sufficiently to permit the shaft to revolve without driving the sprocket, and this will save breakage of the curtain and its operating parts.

It will be appreciated that while the invention is shown in great detail as is necessary for a complete understanding thereof, the design may be altered or modified by those skilled in this art without involving a departure from the principles and objects of the invention. The clutch as shown herein is adaptable for many and varied uses and is not restricted to the particular use for which it has been described.

What is claimed is:

In a clutch device, a shaft and a wheel mounted thereon and adapted to rotate about the shaft, and means for establishing a driving connection between the shaft and the wheel comprising a sleeve movable longitudinally on the shaft, a second sleeve fixed to the wheel and surrounding the first said sleeve but spaced therefrom, a plurality of spaced friction disks feathered to and lying within the second sleeve, a plurality of friction disks feathered to the first sleeve and lying in alternation with the other disks, a cam on the outer surface of the first-named sleeve, a collar rotatable and slidable on the shaft, a second cam on the surface of the collar cooperating with the first-named cam, and an adjustable stop on the outer end of the shaft to limit the outward movement of the collar.

EARL J. VALLEN.